US011762607B2

(12) United States Patent
Wang

(10) Patent No.: US 11,762,607 B2
(45) Date of Patent: Sep. 19, 2023

(54) PRINT DRIVING CONTROL METHOD AND APPARATUS THEREOF, STORAGE MEDIUM, AND PROGRAM PRODUCT

(71) Applicant: Zhuhai Pantum Electronics Co., Ltd., Zhuhai (CN)

(72) Inventor: Aosong Wang, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 17/686,728

(22) Filed: Mar. 4, 2022

(65) Prior Publication Data

US 2022/0283751 A1  Sep. 8, 2022

(30) Foreign Application Priority Data

Mar. 5, 2021  (CN) .......................... 202110246002.9

(51) Int. Cl.
*G06F 3/12*  (2006.01)

(52) U.S. Cl.
CPC ............ *G06F 3/121* (2013.01); *G06F 3/1247* (2013.01); *G06F 3/1267* (2013.01)

(58) Field of Classification Search
CPC ...... G06F 3/121; G06F 3/1247; G06F 3/1267; G06F 3/126; G06F 3/1285; G06F 3/1203; G06F 3/1237; G06F 3/1279
See application file for complete search history.

(56) References Cited

U.S. PATENT DOCUMENTS

| 2004/0196482 | A1* | 10/2004 | Kurita | ................... G06F 3/1285 |
| | | | | 358/1.12 |
| 2005/0219592 | A1* | 10/2005 | Toda | ..................... G06K 15/02 |
| | | | | 358/1.15 |
| 2006/0126102 | A1 | 6/2006 | Sakuda | |
| 2007/0127047 | A1* | 6/2007 | Kanakubo | ............. G06F 3/1208 |
| | | | | 358/1.15 |
| 2013/0120784 | A1 | 5/2013 | Takagi | |

FOREIGN PATENT DOCUMENTS

EP  1174789 A2  1/2002

* cited by examiner

*Primary Examiner* — Huo Long Chen
(74) *Attorney, Agent, or Firm* — ANOVA LAW GROUP, PLLC

(57) ABSTRACT

Print driving control method and apparatus, a storage medium, and a program product are provided. The method includes transmitting a converted print task content to a background processing module of an operating system of a terminal device; receiving the print task content processed and transmitted by the background processing module, and caching the print task content in a memory space preset where the print task content includes print data and print identifiers; and determining whether the print identifiers includes a job end identifier to obtain a first determination result, determining a transmitting strategy according to the first determination result, and transmitting the print task content according to the transmitting strategy.

17 Claims, 5 Drawing Sheets

PRINT DRIVING CONTROL METHOD AND APPARATUS THEREOF, STORAGE MEDIUM, AND PROGRAM PRODUCT

CROSS-REFERENCE TO RELATED APPLICATION

This application claims priority to Chinese patent application No. 202110246002.9, filed on Mar. 5, 2021, in the China National Intellectual Property Administration, the entirety of all of which is incorporated herein by their reference

TECHNICAL FIELD

The present disclosure generally relates to the field of printing technology and, more particularly, relates to a print driving control method and its apparatus, a storage medium, and a program product.

BACKGROUND

When a user's terminal device (e.g., a computer) is connected to an image forming apparatus (e.g., a printer), the user may perform printing tasks by transmitting the print content needed to the printer. During such process, if the user finds that the content transmitted to the image forming apparatus is not the content that the user intends to print, the user may instruct the printer to stop printing by a printing cancellation manner.

In the existing technology, the user may cancel printing by a manner of canceling a print task job in a print pool, where the print pool may be understood as a logical printer for managing the content to be printed.

However, when the print task job is canceled by the above-mentioned manner, since the terminal device transmits the content to the printer for printing in real time, the printer may have problems due to improper cancellation timing, thereby affecting the normal use of the printer.

SUMMARY

One aspect of the present disclosure provides a print driving control method, applied to a terminal device. The method includes converting print task content, transmitted by application software, into a form recognizable by an image forming apparatus, and transmitting the converted print task content to a background processing module of an operating system of the terminal device; receiving the print task content processed and transmitted by the background processing module, and caching the print task content in a memory space preset in units of pages, wherein the print task content includes print data and print identifiers; and determining whether the print identifiers in the print task content cached in the memory space includes a job end identifier to obtain a first determination result, determining a transmitting strategy of the print task content according to the first determination result, and transmitting the print task content to the image forming apparatus according to the transmitting strategy, such that the image forming apparatus prints the print data in the print task content.

Another aspect of the present disclosure provides a terminal device. The terminal device includes a memory for storing computer program for a print driving control method; and a processor coupled to the memory and configured, when the computer program being executed, to: convert print task content, transmitted by application software, into a form recognizable by an image forming apparatus, and transmit the converted print task content to a background processing module of an operating system of the terminal device; receive the print task content processed and transmitted by the background processing module, and cache the print task content in a memory space preset in units of pages, wherein the print task content includes print data and print identifiers; and determine whether the print identifiers in the print task content cached in the memory space includes a job end identifier to obtain a first determination result, determine a transmitting strategy of the print task content according to the first determination result, and transmit the print task content to the image forming apparatus according to the transmitting strategy, such that the image forming apparatus prints the print data in the print task content.

Another aspect of the present disclosure provides a non-transitory computer-readable storage medium, containing computer-executable instructions. When being executed, the computer-executable instructions cause a processor to preform a print driving control method. The method includes: converting print task content, transmitted by application software, into a form recognizable by an image forming apparatus, and transmitting the converted print task content to a background processing module of an operating system of the terminal device; receiving the print task content processed and transmitted by the background processing module, and caching the print task content in a memory space preset in units of pages, wherein the print task content includes print data and print identifiers; and determining whether the print identifiers in the print task content cached in the memory space includes a job end identifier to obtain a first determination result, determining a transmitting strategy of the print task content according to the first determination result, and transmitting the print task content to the image forming apparatus according to the transmitting strategy, such that the image forming apparatus prints the print data in the print task content.

BRIEF DESCRIPTION OF THE DRAWINGS

The accompanying drawings, which are incorporated to be a part of the specification, illustrate embodiments consistent with the present disclosure and together with the specification to explain the principles of the disclosure.

The above-mentioned drawings have clearly shown embodiments of the present disclosure and are described in greater detail hereinafter. The drawings and written description are not intended to limit the scope of the disclosed concept in any way, but rather to illustrate the disclosed concept to those skilled in the art by referring to specific embodiments.

DETAILED DESCRIPTION

To illustrate the objectives, technical solutions, and advantages of embodiments of the present disclosure, the technical solutions in embodiments of the present disclosure are clearly and completely described below with reference to the accompanying drawings in embodiments of the present disclosure. Obviously, the described embodiments are some, but not all embodiments of the present disclosure. Based on embodiments of the present disclosure, all other embodiments obtained by those skilled in the art without creative efforts shall fall within the protection scope of the present disclosure.

The terms used in embodiments of the present disclosure are only for the purpose of describing specific embodiments and are not intended to limit the present disclosure. As used in embodiments of the present disclosure, the singular forms "a" and "the" are intended to include the plural forms as well, unless the context clearly dictates otherwise.

Depending on the context, the words "if" used herein may be interpreted as "at" or "when" or "in response to determining" or "in response to detecting". Similarly, depending on the context, the phrases "if determine" or "if detect (stated condition or event)" can be interpreted as "when determining" or "in response to determining" or "when detecting (stated condition or event)" or "in response to detecting (stated condition or event)".

It should also be noted that the terms "comprise", "include" or any other variation thereof are intended to cover non-exclusive inclusion, so that an article or system including a series of elements includes not only those elements, but also other elements not explicitly listed, or also includes elements inherent to the article or system. Without further limitation, an element defined by the phrase "includes a . . . " does not preclude the presence of additional identical elements in the article or system that includes the element.

The application scenarios in the present disclosure are described first.

Figure 1:
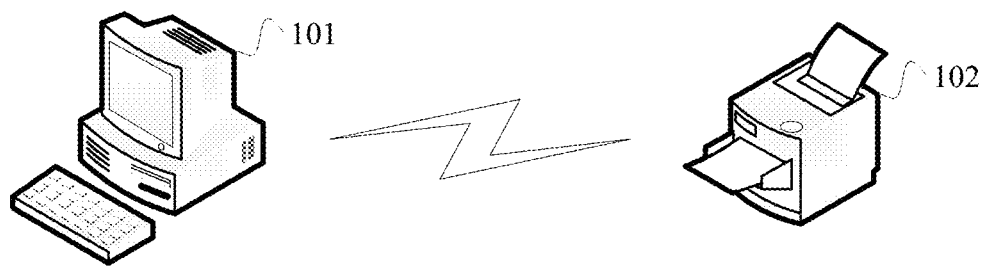
FIG. 1 illustrates a schematic of an application scenario provided by exemplary embodiments of the present disclosure.

FIG. 1 illustrates a schematic of an application scenario provided by exemplary embodiments of the present disclosure. As shown in FIG. 1, a terminal device 101 and an image forming apparatus 102 may be communicably connected. The terminal device 101 may be installed with a print driver which is adapted to the image forming apparatus 102, so that the application software installed in the terminal apparatus 101 may drive the image forming apparatus 102 for printing.

When the user uses the application software in the terminal device 101 for printing, the print driver may be invoked through the application software, and the print manner may be configured. The print driver may drive the image forming apparatus 102 for printing according to the configured print manner.

The image forming apparatus 102 may be a stand-alone printer or may be a multi-function business machine that integrates functions such as printing, copying, scanning, faxing, and the like. The terminal device 101 may be a desktop computer, a laptop computer, or the like. The application software may include, but not be limited to, document editing software, document reading software, office software, and the like.

Figure 2:
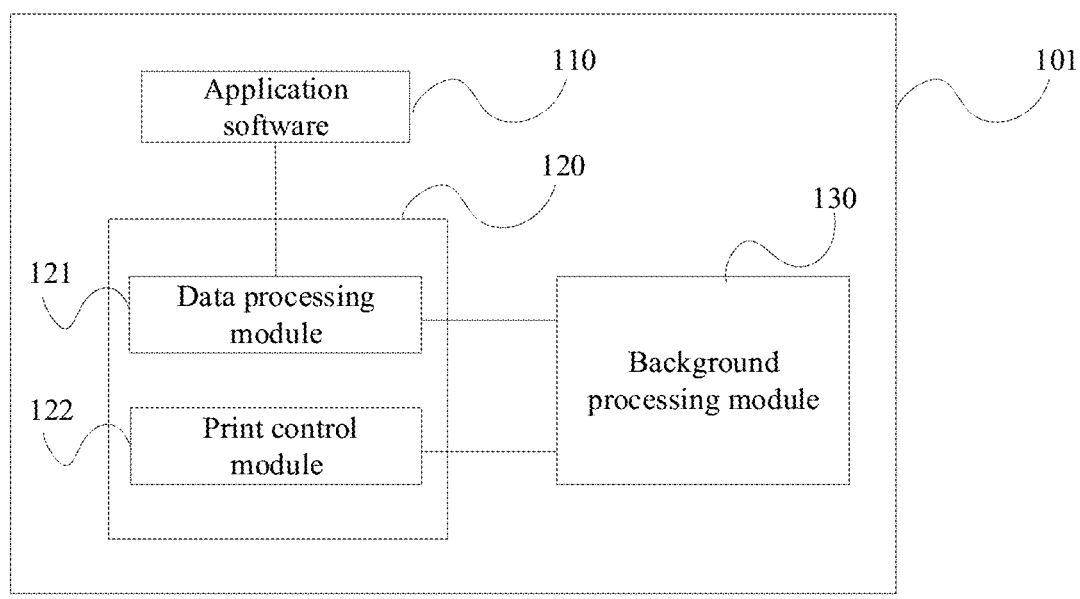
FIG. 2 illustrates a schematic of a terminal device provided by exemplary embodiments of the present disclosure.

FIG. 2 illustrates a schematic of a terminal device provided by exemplary embodiments of the present disclosure. As shown in FIG. 2, the terminal device 101 may include application software 110, a print driver 120, and a background processing module 130 (e.g., print spooler), where the print driver 120 may include a data processing module 121 and a print control module 122 (e.g., language monitor).

The application software 110 may be configured to edit print task content. The data processing module 121 of the print driver 120 may receive the print task content transmitted by the user through the application software 110, convert the print task content into a form recognizable by the printer, and then transmit the converted print task content to the background processing module 130; the background processing module 130 may receive the converted print task content transmitted by the data processing module 121 and transmit the converted print task content to the print control module 122 of the print driver 120 in the form of a data stream; and the print control module 122 may receive the converted print task content in the form of a data stream transmitted by the background processing module 130 and transmit the converted print task content to the printer for printing.

Figure 3:
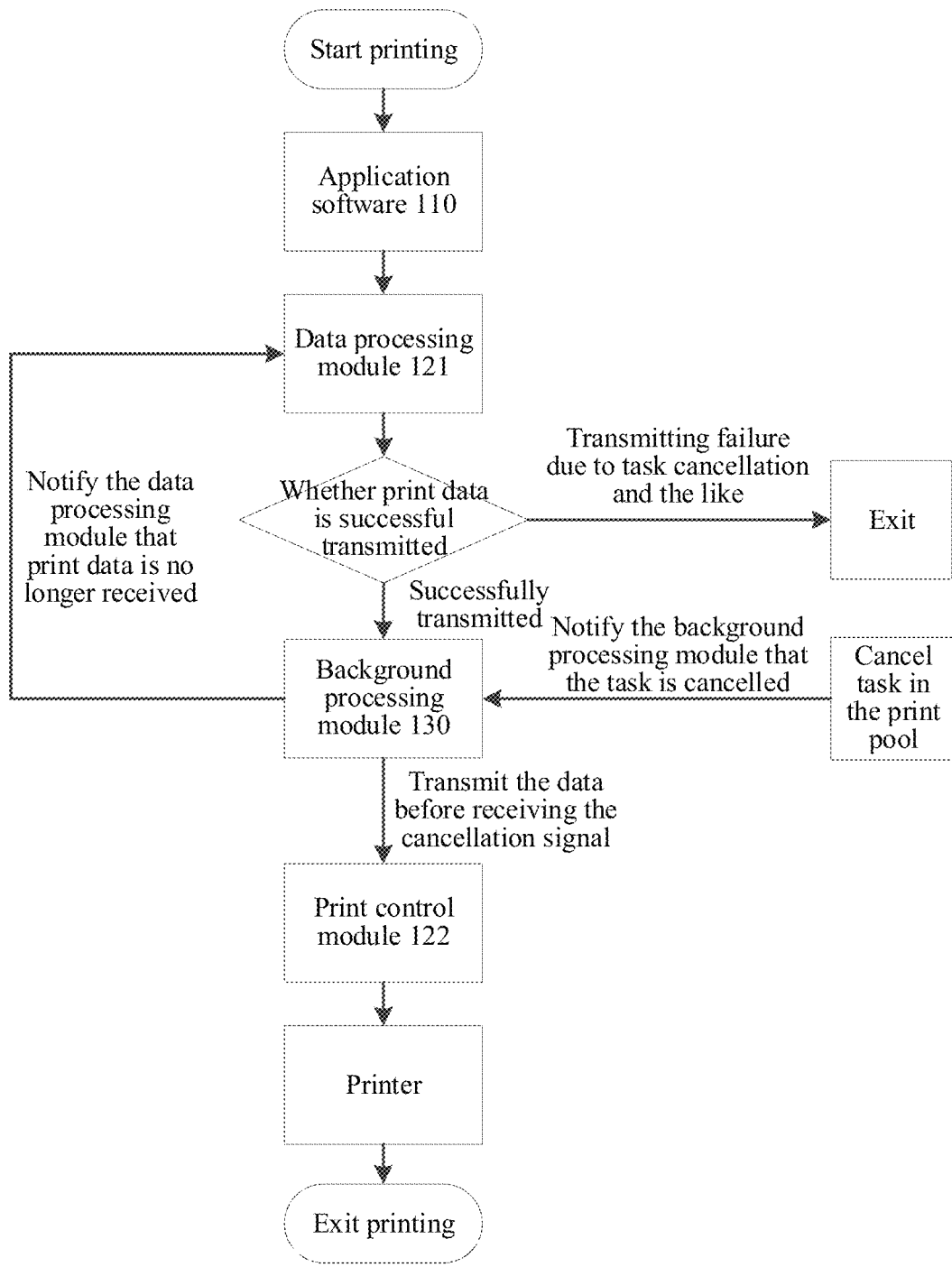
FIG. 3 illustrates a schematic flowchart of printing performed by a terminal device through a printer in the existing technology.

FIG. 3 illustrates a schematic flowchart of printing performed by a terminal device through a printer in the existing technology. Referring to FIGS. 2-3, in the existing technology, when the user chooses to cancel printing in the print pool, the background processing module 130 may receive a print task cancel signal, and then notify the data processing module 121 to prevent the data processing module 121 from continuing to transmit the print task content; meanwhile the background processing module 130 may transmit the print task content that has been received before receiving the print task cancel signal to the print control module 122; after the data processing module 121 receives the notification from the background processing module 130, the print task content may be stopped to be transmitted to the background processing module 130; and after the print control module 122 receives the print task content, which is transmitted by the background processing module 130 and has been received before the print task cancel signal is received, the print control module 122 may transmit the print task content to the printer for printing in real time. Since the print control module 122 transmits the received print task content to the printer for printing in real time, when the user chooses to cancel printing in the print pool, the printer may fail due to the timing of choosing cancellation, thereby affecting subsequent printing. The specific reasons for the failure of the printer due to the timing for choosing cancellation is described below with reference to FIG. 4.

Figure 4:
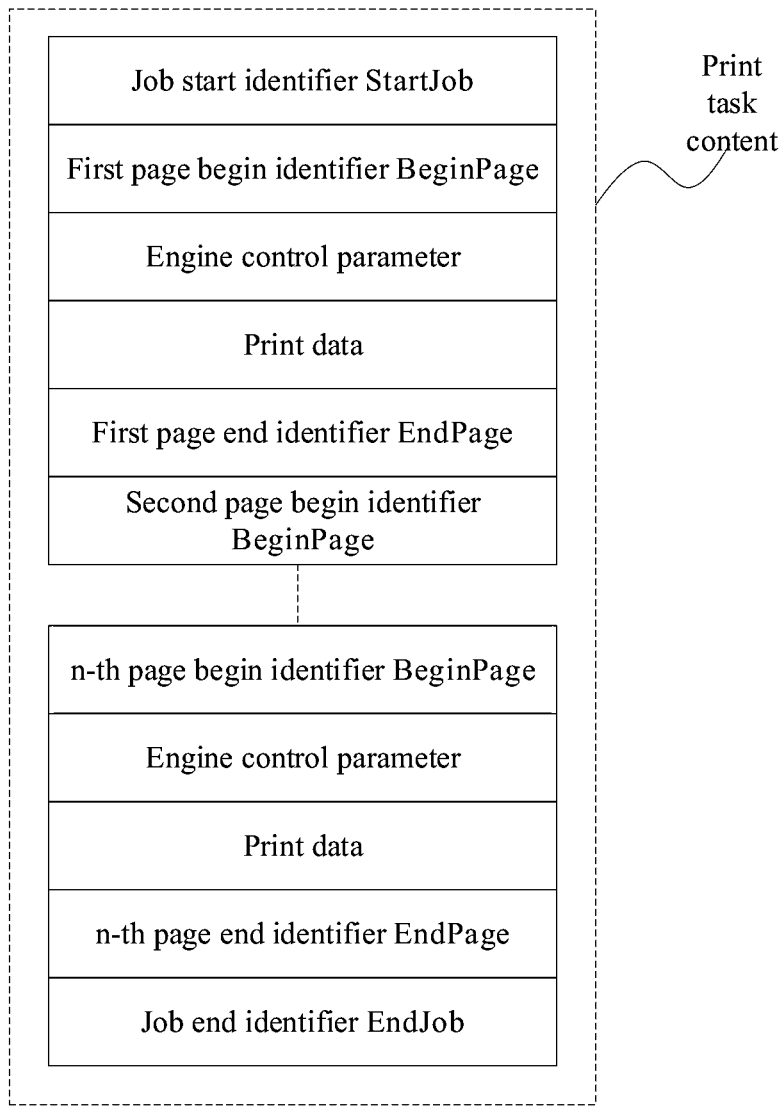
FIG. 4 illustrates a schematic of print task content provided by exemplary embodiments of the present disclosure.

FIG. 4 illustrates a schematic of print task content provided by exemplary embodiments of the present disclosure. As shown in FIG. 4, the print task content may include print identifiers, and the types of the print identifiers may include job identifiers and page identifiers, where the job identifiers may include a job start identifier StartJob and a job end identifier EndJob, and the page identifiers may include a page-beginning-identifier BeginPage and a page-ending-identifier EndPage. Only a pair of job identifiers may be in a print task content; for each print job, a StartJob may be at the beginning of the job and an EndJob may be at the end of the job; a job may have multiple pairs of page identifiers, BeginPage may indicate the beginning of a page, EndPage may indicate the end of a page, and BeginPage and EndPage may appear in pairs; and the pairs of the page identifiers may be same as the number of pages of the print task content. In addition, the print task content may also include engine control parameters, print data, and the like.

When the print task needs to be canceled, the user may cancel the print by canceling the print task job in the print pool. However, when the print task job is canceled by the above-mentioned manner shown in FIG. 3, since the terminal device transmit the content to the printer for printing in real time, it may cause printer problem due to improper cancellation timing, thereby affecting the normal use of the printer.

Specifically, canceling the print task does not indicate that all print tasks can be canceled. For example, if the user chooses to cancel printing after sending the print task of 20 pages to the printer using the terminal device, the printer may print 0~20 pages depending on the interval between the cancellation time and the transmitting time (that is, if the cancellation is quick, one page may not be printed out, and if the cancellation is slow, all pages may be printed out). In the existing technology, since the print control module 122 transmits the received print task content to the printer in real time, the print task content inputting into the print control module 122 must be transmitted to the printer for printing.

However, if the user chooses to cancel the print task in the print pool when the print control module 122 only receives a part of the print task content, the print task content received by the printer may be an incomplete print task content without the job end identifier EndJob or without the page-ending-identifier EndPage and the job end identifier EndJob. Corresponding to the incomplete print task content without the EndPage identifier, the printer may not perform page division normally, which may result in the printer to print wrong pages. In addition, when there is no EndJob identifier, the printer may always be in a state of waiting for the EndJob identifier, so that the current print task may not end normally, thereby further affecting the printing of the next task.

The print driving control method and its apparatus, a storage medium and a program product provided by the present disclosure aim to solve the above-mentioned technical problems in the existing technology.

The solution in the present disclosure may be described herein. When the print control module receives the print task content transmitted by the background processing module, the print control module may first temporarily cache the print task content, instead of directly transmitting the print task content to the printer; after the print task content is cached, the transmitting strategy of the print task content may be determined according to whether the print task content includes a job end identifier. Therefore, the print task content inputting into the print control module may not necessarily be transmitted to the printer for printing, but when the user chooses to cancel the print task in the print pool, the terminal device may adjust the transmitting strategy accordingly. Therefore, no matter what timing the user cancels the print task, the abnormal state of the printer may be avoided, thereby ensuring the normal operation of the printer.

The technical solution of the present disclosure and how the technical solution of the present disclosure solves the above-mentioned technical problems are described in detail below with specific examples. Following specific embodiments may be combined with each other, and same or similar concepts or processes may not be repeated in some embodiments. Embodiments of the present disclosure are described below with reference to the accompanying drawings.

It can be understood that the processing steps of the control method in the present disclosure may be implemented by the terminal device shown in FIGS. 1-2, specifically, may be implemented by the print control module in the terminal device. The control method in the present disclosure may be applied in the print process.

Figure 5:
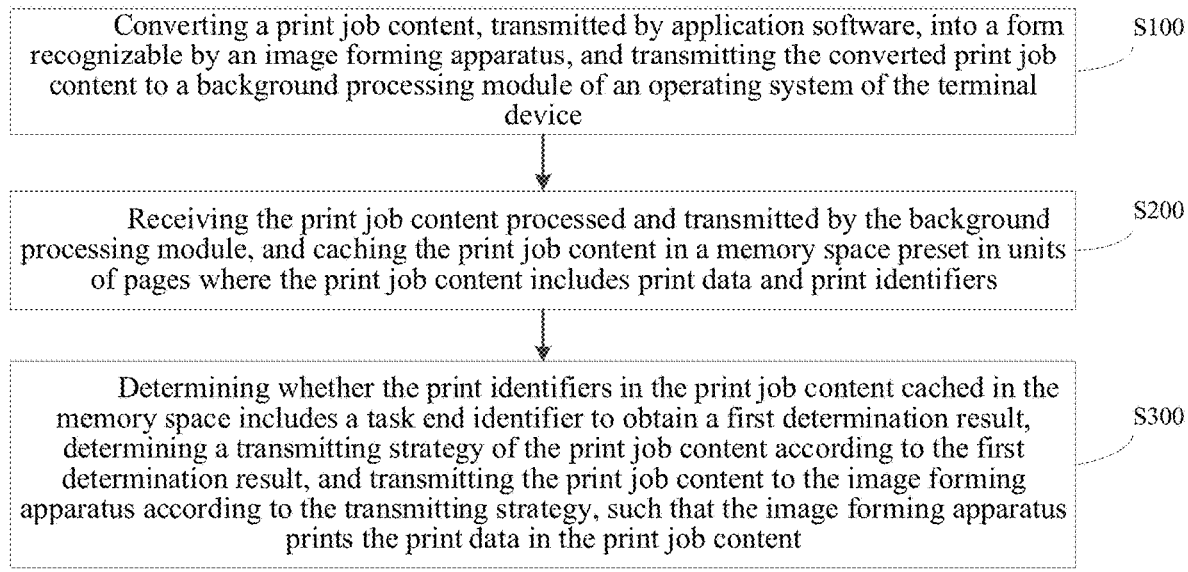
FIG. 5 illustrates a schematic of a control method provided by exemplary embodiments of the present disclosure.

FIG. 5 illustrates a schematic of a control method provided by exemplary embodiments of the present disclosure. As show in FIG. 5, the method may mainly include the following steps.

At S100, the print task content transmitted by the application software may be converted into a form recognizable by the image forming apparatus, and the converted print task content may be transmitted to the background processing module of the operating system of the terminal device.

At S200, the print task content processed and transmitted by the background processing module may be received, the print task content may be cached in a memory space preset in units of pages, and the print task content may include print data and print identifiers.

Specifically, after the data processing module of the print driver converts the print task to obtain a form recognizable by the printer which is transmitted to the background processing module of the operating system of the terminal device, the print task content may be transmitted to the print control module by the background processing module in the form of a data stream. In addition, the content transmitted by the background processing module may also include the print identifiers.

The difference between one embodiment and the existing technology may be that in one embodiment, after receiving the print task content, the print control module may not transmit the print task content in the form of a data stream to the printer for printing in real time, instead, the print task content may be first cached in the memory space preset. Therefore, the print task content inputting into the print control module may not necessarily be transmitted to the printer for printing.

Optionally, when the print task content is cached, it may be temporarily stored in units of pages. The memory space may be allocated in advance, and the memory space may be specially allocated for caching the print task content.

At S300, whether the print identifiers in the print task content that has been cached in the memory space includes the job end identifier may be determined to obtain the first determination result, the transmitting strategy of the print task content may be determined according to the first determination result, and the print task content may be transmitted to the image forming apparatus according to the transmitting strategy, such that the image forming apparatus may print the print data in the print task content.

After the print task content is cached in the memory space, the print control module may determine whether the print identifiers in the print task content cached in the memory space includes the job end identifier and obtain corresponding first judgment result.

The first determination result may specifically include that the print task content includes the job end identifier, and the print task content does not include the job end identifier.

When the print task content includes the job end identifier, it may indicate that the print task content of the background processing module has been transmitted completely, and may also indicate that in such process, the user may not cancel the print task, or the user may cancel the print task too late to intercept the print task.

When the print task content does not include the job end identifier, it may indicate that the print task content of the background processing module has not been transmitted completely, that is, only a part of the print task content has been transmitted, and may also indicate that in such process, the user may cancel the print task.

After obtaining the first determination result of whether the print task content includes the job end identifier, the print control module may determine whether all print task content of the background processing module is transmitted completely according to the first determination result and determine if the user has canceled the print task. Therefore, the print control module may determine the transmitting strategy of the print task content according to the first judgment result and transmit the print task content to the image forming apparatus according to the transmitting strategy, such that the image forming apparatus may print the print task content.

The control method, applied to the terminal device, is provided in one embodiment. When receiving the print task content transmitted by the background processing module, the print task content may be temporarily cached first, instead of being directly transmitted to the printer; after the print task content is cached, the transmitting strategy of the print task content may be determined according to whether the print task content includes the job end identifier. Therefore, the print task content inputting into the print control module may not necessarily be transmitted to the printer for printing, but when the user chooses to cancel the print task in the print pool, the terminal device may adjust the transmitting strategy accordingly. Therefore, no matter what timing the user cancels the print task, the abnormal state of the printer may be avoided, thereby ensuring the normal operation of the printer.

In some embodiments, the transmitting strategy of the print task content may be determined according to the first determination result, and the print task content may be transmitted to the image forming apparatus according to the transmitting strategy, which may include:

S310, if the print task content includes the job end identifier, it may determine that complete print task content that has been cached in the memory space is directly transmitted to the image forming apparatus.

Specifically, when the print task content includes the job end identifier, it may indicate that the print task content of the background processing module has been transmitted completely, and may also indicate that in such process, the user may not cancel the print task, or the user may cancel the print task too late to intercept the print task.

That is, in one embodiment, the BeginPage identifiers and the EndPage identifiers in the print task content that has been cached in the memory space may have a one-to-one correspondence, and there may be the EndJob identifier.

Therefore, the print control module may directly transmit all print task content that has been cached in the memory space to the image forming apparatus. The print task content includes the job end identifier and the paired BeginPage identifiers and EndPage identifiers, and there is the EndJob identifier, such that when the printer prints according to the print task content, the abnormal state may not occur, thus ensuring the normal operation of the printer.

For example, if the print task content received by the print control module is one complete page with the EndJob identifier, it may indicate that the print task transmitted by the user is one page. Therefore, the print control module may transmit all received content of one page to the printer for printing.

In some embodiments, the transmitting strategy of the print task content may be determined according to the first determination result, and the print task content may be transmitted to the image forming apparatus according to the transmitting strategy, which may include:

S320, if the print task content does not include the job end identifier, it may determine whether each page-beginning-identifier in the print task content has a corresponding page-ending-identifier to obtain the second determination result;

S330, after obtaining the second determination result, it may determine whether the print task cancellation instruction is received to obtain the third determination result; and S340, it may determine the transmitting strategy of the print task content according to the second determination result and the third determination result and transmit the print task content to the image forming apparatus according to the transmitting strategy.

Specifically, when the print task content does not include the job end identifier, it may indicate that the print task content of the background processing module has not been completely transmitted, that is, only a part of the print task content has been transmitted, and may indicate that in such process, the user may cancel the print task.

In one embodiment, the print control module may further determine whether each page-beginning-identifier in the print task content has a corresponding page-ending-identifier to obtain the second determination result.

The second determination result may specifically include that each page-beginning-identifier in the print task content has a corresponding page-ending-identifier, and the print task content has a page-beginning-identifier (the last one page-beginning-identifier) without a corresponding page-ending-identifier.

When each page-beginning-identifier has a corresponding page-ending-identifier, it may indicate that the print task content transmitted by the background processing module is in whole pages.

However, when the print task content has a page-beginning-identifier without a corresponding page-ending-identifier, it may indicate that the print task content transmitted by the background processing module includes the content of remaining pages.

Furthermore, after obtaining the second determination result, the print control module may determine whether the print task cancellation instruction is received to obtain the third determination result. The third determination result may specifically include that the print task cancellation instruction is received and include the print task cancellation instruction is not received, where if the print task cancellation instruction is received, it may indicate that the user has an operation of canceling the print task.

Optionally, the print task cancellation instruction may be a signal for the user to cancel the print task in the print pool, and the print task cancellation instruction may be received by the background processing module to notify the print control module.

Therefore, the print control module may determine the transmitting strategy of the print task content according to the second determination result and the third determination result and transmit the print task content to the image forming apparatus according to the transmitting strategy, which may avoid the abnormal state of the printer and ensure the normal operation of the printer.

In some embodiments, the print control module may determine the transmitting strategy of the print task content according to the second determination result and the third determination result and transmit the print task content to the image forming apparatus according to the transmitting strategy, which may include:

S341, if each page-beginning-identifier in the print task content has a corresponding page-ending-identifier and the print task cancellation instruction is received, the job end identifier may be added on the last page of the print task content, and the print task content added with the job end identifier may be transmitted to the image forming apparatus.

Specifically, if each page-beginning-identifier in the print task content has a corresponding page-ending-identifier, it may indicate that the print task content transmitted by the background processing module is in whole pages. In addition, since the print task cancellation instruction is received, it may indicate that the user may cancel the print task. At this point, there is no print task content that can be transmitted to the print control module in the background processing module. Therefore, the print control module may not receive the print task content from the background processing module.

That is, in one embodiment, the BeginPage identifiers and the EndPage identifiers in the print task content that has been cached in the memory space may be in one-to-one correspondence, but there may be no EndJob identifier.

Therefore, the print control module may first add the job end identifier on the last page of the print task content, and then transmit the processed print task content to the image forming apparatus. Since the print task content includes the job end identifier and the paired BeginPage identifiers and the EndPage identifiers, when the printer prints according to the print task content, the abnormal state may not occur, thereby ensuring the normal operation of the printer.

For example, if the print task content received by the print control module does not have the EndJob identifier but has one complete page with a one-to-one correspondence between the BeginPage identifier and the EndPage identifier, the print task transmitted by the user may be more than one page, such as three pages or the like. Therefore, the print control module may add the EndJob identifier to the received one-page content which is transmitted to the printer for printing.

In some embodiments, the print control module may determine the transmitting strategy of the print task content according to the second determination result and the third determination result and transmit the print task content to the image forming apparatus according to the transmitting strategy, which may include:

S342, if the last one page-beginning-identifier in the print task content does not have a corresponding page-ending-identifier, and the print task cancellation instruction is received, the content after the last one page-ending-identifier in the print task content may be discarded, the job end identifier may be added on the last page of the remaining print task content, and the print task content added with the job end identifier may be transmitted to the image forming apparatus.

Specifically, when the last one page-beginning-identifier of the print task content does not have a corresponding page-ending-identifier, it may indicate that the print task content transmitted by the background processing module may include the content of remaining pages. In addition, since the print task cancellation instruction is received, it may indicate that the user may cancel the print task. At this point, there is no print task content that can be transmitted to the print control module in the background processing module. Therefore, the print control module may not receive the print task content from the background processing module.

That is, in one embodiment, the BeginPage identifiers and the EndPage identifiers in the print task content that has been cached in the memory space may not be in one-to-one correspondence, and there may be no EndJob identifier.

Therefore, to avoid the situation of printing wrong pages, the print control module may directly discard the content of the remaining pages. That is, the content after the last one page-ending-identifier in the print task content may be discarded. That is, the page-beginning-identifiers without a corresponding page-ending-identifiers may be discarded, thereby ensuring that the remaining BeginPage identifiers and EndPage identifiers in the print task content are in a one-to-one correspondence.

In addition, the print control module may also add the job end identifier on the last page of the remaining print task content and then transmit the processed print task content to the image forming apparatus. Since the print task content includes the job end identifier and the paired BeginPage identifiers and the EndPage identifiers, when the printer prints according to the print task content, the abnormal state may not occur, thereby ensuring the normal operation of the printer.

For example, if the print task content received by the print control module is 3.5 pages, but the print task transmitted by the user is more than 3 pages, such as 8 pages or the like. Therefore, the print control module may discard the remaining content of the half page, and then transmit received complete content of three pages to the printer for printing.

In some embodiments, the print control module may determine the transmitting strategy of the print task content according to the second determination result and the third determination result and transmit the print task content to the image forming apparatus according to the transmitting strategy, which may include:

S343, if each page-beginning-identifier in the print task content has a corresponding page-ending-identifier and the print task cancellation instruction is not received, all cached print task content may be transmitted to the image forming apparatus, and the print task content may continue to be received.

Specifically, if each page-beginning-identifier in the print task content has a corresponding page-ending-identifier, it may indicate that the print task content transmitted by the background processing module is in whole pages. In addition, since the print task cancellation instruction is not received, it may indicate that the user does not have the operation of canceling the print task. At this point, the print control module may continue to receive the print task content transmitted by the background processing module.

That is, in one embodiment, the BeginPage identifiers and the EndPage identifiers in the print task content that has been cached in the memory space may have a one-to-one correspondence, but there may be no EndJob identifier.

Therefore, at this point, the print control module may transmit all cached print task content to the image forming apparatus and continue to receive the print task content.

It can be understood that in the present disclosure, when the print control module caches the print task content in the memory space preset in units of pages, different caching strategies may be adopted. Specifically, the print task content may be cached in units of a single page. That is, whenever the print control module determines that the cached print task content reaches one page, it may transmit the cached one-page print task content to the image forming apparatus for printing and continue to receive the print task content.

In addition, the print task content may be cached in units of multiple pages, such as 5 pages or the like. Whenever the print control module determines that the content of the cached print task reaches a preset number of pages, the cached multiple-page print task content may be transmitted to the image forming apparatus for printing, and the print task content may continue to be received.

Correspondingly, in one embodiment, if the print control module determines that each page-beginning-identifier in the print task content has a corresponding page-ending-identifier and the print task cancellation instruction is not received, the number of cached pages may be compared to the preset number of pages. If the preset number of pages is reached, all cached print task content may be transmitted to the image forming apparatus, and the print task content may continue to be received.

The preset number of pages may be determined according to the caching strategy. When being cached in units of a single page, the preset number of pages may be 1. When being cached in units of multiple pages (for example, N, an integer greater than 1, pages of print task content are simultaneously cached), the preset number of pages may be N.

Therefore, it may ensure that the print task content transmitted by the print control module to the image forming apparatus is in whole pages, thereby avoiding the case of printing wrong pages.

In some embodiments, the print control module may determine the transmitting strategy of the print task content according to the second determination result and the third determination result and transmit the print task content to the image forming apparatus according to the transmitting strategy, which may include:

S344, if the last one page-beginning-identifier in the print task content does not have a corresponding page-ending-identifier and the print task cancellation instruction is not received, the print task content may continue to be received and cached until the last one page-beginning-identifier in the cached print task content has a corresponding page-ending-identifier, and all cached print task content may be transmitted to the image forming apparatus.

Specifically, when the last one page-beginning-identifier of the print task content does not have a corresponding page-ending-identifier, it may indicate that the print task content transmitted by the background processing module may include the content of remaining pages. In addition, since the print task cancellation instruction is not received, it may indicate that the user does not have the operation of canceling the print task. At this point, the print control module may continue to receive the print task content transmitted by the background processing module.

That is, in one embodiment, the BeginPage identifiers and the EndPage identifiers in the print task content that has been cached in the memory space may not have a one-to-one correspondence, and there may be no EndJob identifier.

Therefore, to avoid printing error pages, the print control module may continue to receive and cache the print task content until the last one page-beginning-identifier in the cached print task content has a corresponding page-ending-identifier and transmit all cached print task content to the image forming apparatus.

It can be understood that the print control module may continue to receive and cache the print task content until the last one page-beginning-identifier in the cached print task content has a corresponding page-ending-identifier; and if the print task cancellation instruction is not received, follow-up processing may be performed according to the process flow in embodiments corresponding to step S343, which may not be described in detail herein.

In some embodiments, the method may further include when obtaining new print task content is currently stopped, if the print task cancellation instruction is not received and un-transmitted print task content is still in the memory space, an error message may be outputted.

Specifically, when the print task content does not include the job end identifier, obtaining new print task content may be currently stopped. That is, it may indicate that the background processing module may stop transmitting the print task content in the form of a data stream to the print control module.

However, since the print task cancellation instruction is not received at this point, it may indicate that there is no user's operation to cancel the print task, and un-transmitted print task content is still in the memory space; such that the print control module may confirm that the printing process fails. Therefore, the print control module may output error prompt message to prompt the related user to perform trouble-shooting process, thereby ensuring the normal operation of the printer.

In some embodiments, the overall flow of the print task job between the terminal device and the printer is described.

Figure 6:
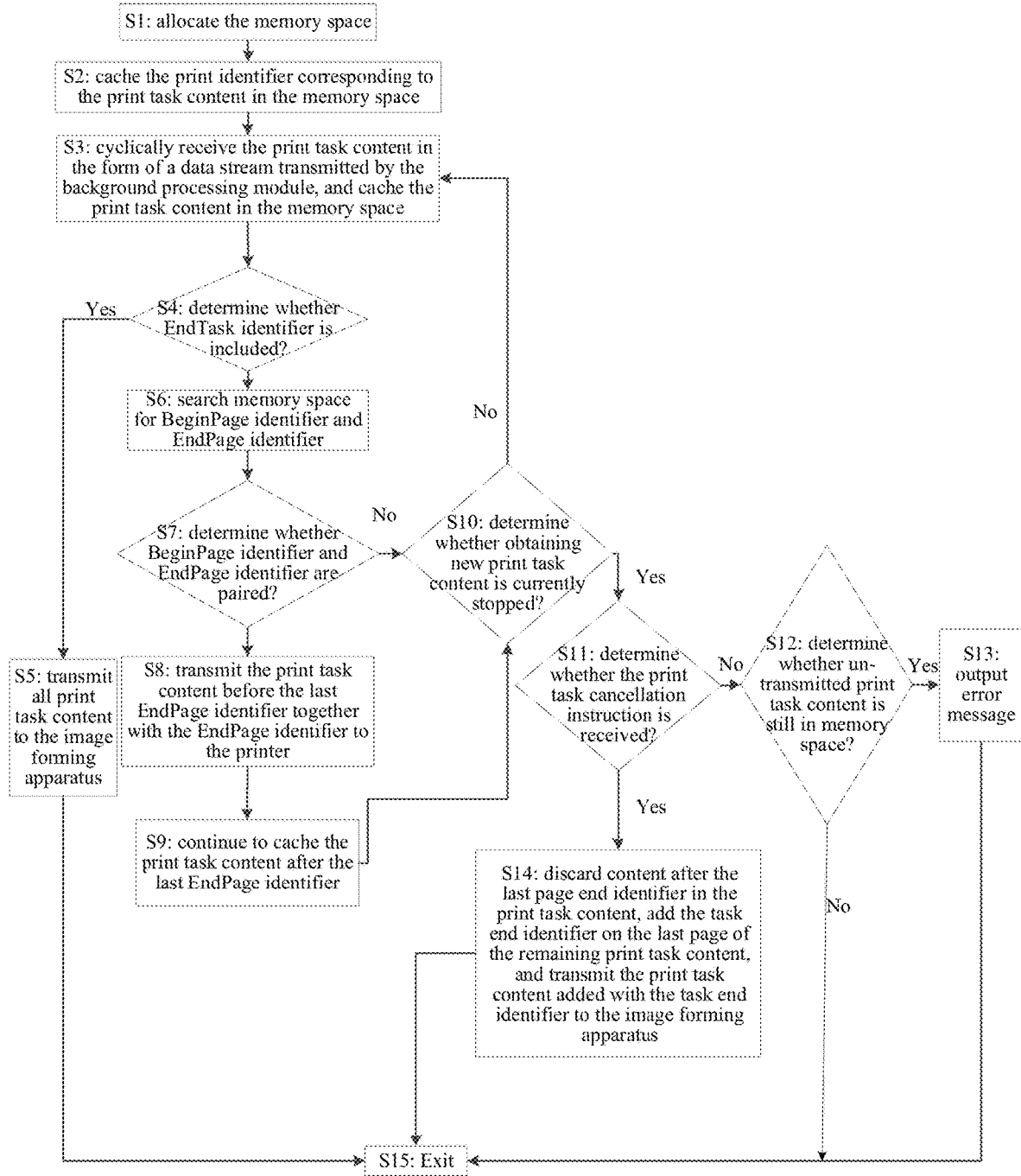
FIG. 6 illustrates a complete schematic flowchart of a print task job between a terminal device and a printer provided by exemplary embodiments of the present disclosure.

FIG. 6 illustrates a complete schematic flowchart of a print task job between a terminal device and a printer provided by exemplary embodiments of the present disclosure. As shown in FIG. 6, the process may include:

S1, a memory space may be allocated for the print control module to cache the print task content;

S2, the print control module may obtain the print task content, and the print identifiers corresponding to the print task content may be cached in the memory space;

S3, the print control module may cyclically receive the print task content in the form of a data stream transmitted by the background processing module, and cache the print task content in the memory space;

S4, the print control module may determine whether the cached print task content includes the EndJob identifier;

S5, if the print task content includes the EndJob identifier, the print control module may transmit all print task content to the image forming apparatus, and then exit;

S6, if the print task content does not include the EndJob identifier, the print control module may search the memory space for the BeginPage identifier and the EndPage identifier;

S7, the print control module may determine whether the BeginPage identifier and the EndPage identifier are paired; and if the BeginPage identifier and the EndPage identifier are not paired, execute S9;

S8, if the BeginPage identifier and the EndPage identifier are paired, the print control module may transmit the print task content before the last EndPage identifier together with the EndPage identifier to the printer, and the print task content after the last EndPage identifier may continue to be cached;

S9, the print task content after the last EndPage identifier may continue to be cached, and execute S10;

S10, the print control module may determine whether the current background processing module stops obtaining new print task content, that is, determine whether the background processing module stops transmitting the print task content; if no, return to S3; and if yes, execute S11;

S11, if obtaining new print task content is stopped, the print control module may determine whether the print task cancellation instruction is received;

S12, if the print task cancellation instruction is not received, the print control module may determine whether un-transmitted print task content is still in the memory space;

S13, if un-transmitted print task content is still in the memory space, an error message may be outputted, and then exit; and S14, the content after the last one page-ending-identifier in the print task content may be discarded, the job end identifier may be added on the last page of the remaining print task content, the print task content added with the job end identifier may be transmitted to the image forming apparatus, and then exit.

It can be understood that, although the steps in the flow charts in above-mentioned embodiments are sequentially displayed according to the arrows, these steps are not necessarily executed in the order indicated by the arrows. Unless explicitly stated herein, the execution of these steps is not strictly limited to the order and may be performed in other orders. Furthermore, at least some steps in the drawings may include multiple sub-steps or multiple stages. These sub-steps or stages may not be necessarily executed at the same time but may be executed at different times. The execution order may also not be necessarily sequential but may be performed alternately with at least a part of other steps, or sub-steps of other steps, or stages. In some embodiments, the print driving control apparatus applied to the terminal device is provided, including:

a data processing module, configured to convert the print task content transmitted by the application software into a form recognizable by the image forming apparatus, and transmit the converted print task content to the background processing module of the operating system of the terminal device; and a print control module, configured to receive the print task content transmitted by the background processing module, and cache the print task content in units of pages in the memory space preset, where the print task content may include print data and print identifiers.

The print control module may further be configured to determine whether the print identifier in the print task content that has been cached in the memory space includes the job end identifier to obtain the first judgment result; and according to the first determination result, determine the transmitting strategy of the print task content and transmit the print task content to the image forming apparatus according to the transmitting strategy. Therefore, the image forming apparatus may print the print data in the print task content.

For the above-mentioned print driving control apparatus, when the print control module receives the print task content transmitted by the background processing module, the print control module may first temporarily cache the print task content, instead of directly transmitting the print task content to the printer; after the print task content is cached, the transmitting strategy of the print task content may be determined according to whether the print task content includes the job end identifier. Therefore, the print task content inputting into the print control module may not necessarily be transmitted to the printer for printing, but when the user chooses to cancel the print task in the print pool, the terminal device may adjust the transmitting strategy accordingly. Therefore, no matter what timing the user cancels the print task, the abnormal state of the printer may be avoided, thereby ensuring the normal operation of the printer.

In some embodiments, a computer-readable storage medium is provided, where computer-executable instructions are stored in the computer-readable storage medium, and when being executed by a processor, the computer-executable instructions are used to implement the steps of each method embodiment of the present disclosure.

In some embodiments, a computer program product is provided, including a computer program. When being executed by a processor, the computer program is used to implement the steps of each method embodiment of the present disclosure.

The present disclosure provides the print driving control method and its apparatus, the storage medium, and the program product. The method includes converting a print task content, transmitted by application software, into a form recognizable by an image forming apparatus, and transmitting the converted print task content to a background processing module of an operating system of the terminal device; receiving the print task content processed and transmitted by the background processing module, and caching the print task content in a memory space preset in units of pages where the print task content may include print data and print identifiers; and determining whether the print identifiers in the print task content cached in the memory space includes a job end identifier to obtain a first determination result, determining a transmitting strategy of the print task content according to the first determination result, and transmitting the print task content to the image forming apparatus according to the transmitting strategy, such that the image forming apparatus prints the print data in the print task content. When the print control module receives the print task content transmitted by the background processing module, the print control module may first temporarily cache the print task content, instead of directly transmitting the print task content to the printer; after the print task content is cached, the transmitting strategy of the print task content may be determined according to whether the print task content includes the job end identifier. Therefore, the print task content inputting into the print control module may not necessarily be transmitted to the printer for printing, but when the user chooses to cancel the print task in the print pool, the terminal device may adjust the transmitting strategy accordingly. Therefore, no matter what timing the user cancels the print task, the abnormal state of the printer may be avoided, thereby ensuring the normal operation of the printer.

Those skilled in the art should understand that all or part of the processes in the methods of above-mentioned embodiments may be implemented by instructing relevant hardware through a computer program. The computer program may be stored in a non-volatile computer-readable storage medium, and when being executed, the computer program may include the processes of above-mentioned method embodiments. Any reference to a memory, storage, database, or other medium used in various embodiments provided herein may include non-volatile and/or volatile memory. Nonvolatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. For illustration and not limitation, RAM may be available in various forms such as static RAM (SRAM), dynamic RAM (DRAM), synchronous DRAM (SDRAM), double data rate SDRAM (DDRSDRAM), enhanced SDRAM (ESDRAM), synchronous chain Road (Synchlink) DRAM (SLDRAM), memory bus (Rambus) direct RAM (RDRAM), direct memory bus dynamic RAM (DRDRAM), and memory bus dynamic RAM (RDRAM), and the like.

Other embodiments of the present disclosure may be readily understood by those skilled in the art upon consideration of the specification and practice of the present application disclosed herein. The present disclosure may be intended to cover any variations, uses, or adaptations of the present disclosure that follow the general principle of the present disclosure and may include common knowledge or techniques in the technical field not disclosed by the present disclosure. The specification and examples may be regarded as exemplary only, with the true scope and spirit of the disclosure being indicated by the following claims.

It can be understood that the present disclosure may not be limited to the precise structures described above and illustrated in the accompanying drawings, and various modifications and changes may be made without departing from the scope thereof. The scope of the present disclosure may be limited only by the appended claims.

What is claimed is:

1. A print driving control method, applied to a terminal device, the method comprising:
    obtaining a print task content recognizable by an image forming apparatus;
    caching the print task content in a memory space, wherein the print task content includes print identifiers;
    determining whether the print identifiers in the print task content cached in the memory space include a job end identifier to obtain a first determination result, and determining a transmitting strategy of the print task content according to the first determination result, by:
        in response to that the print task content does not include the job end identifier, determining whether each page-beginning-identifier in the print task content has a corresponding page-ending-identifier to obtain a second determination result;
        after obtaining the second determination result, determining whether a print task cancellation instruction is received to obtain a third determination result; and
        according to the second determination result and the third determination result, determining the transmitting strategy of the print task content; and
    transmitting the print task content to the image forming apparatus according to the transmitting strategy.

2. The method according to claim 1, wherein determining the transmitting strategy comprises:
    in response to that the print task content includes the job end identifier, transmitting the print task content cached in the memory space to the image forming apparatus.

3. The method according to claim 1, wherein determining the transmitting strategy comprises:
    in response to that the each page-beginning-identifier in the print task content has the corresponding page-ending-identifier and the print task cancellation instruction is received, adding the job end identifier on a last page of the print task content.

4. The method according to claim 1, wherein determining the transmitting strategy comprises:
    in response to that a last one page-beginning-identifier in the print task content does not have a corresponding page-ending-identifier and the print task cancellation instruction is received, discarding content after a last one page-ending-identifier in the print task content.

5. The method according to claim 1, wherein determining the transmitting strategy comprises:
    in response to that the each page-beginning-identifier in the print task content has the corresponding page-ending-identifier and the print task cancellation instruction is not received, transmitting the cached print task content to the image forming apparatus.

6. The method according to claim 1, wherein determining the transmitting strategy comprises:
    in response to that a last one page-beginning-identifier in the print task content does not have a corresponding page-ending-identifier and the print task cancellation instruction is not received, continuing to receive and cache the print task content until a last one page-beginning-identifier in cached print task content has a corresponding page-ending-identifier.

7. A terminal device, comprising: a memory for storing computer program for a print driving control method; and a processor coupled to the memory and configured, when the computer program being executed, to:
    obtain a print task content recognizable by an image forming apparatus
    cache the print task content in a memory space, wherein the print task content includes print identifiers;
    determine whether the print identifiers in the print task content cached in the memory space include a job end identifier to obtain a first determination result, and determine a transmitting strategy of the print task content according to the first determination result, by:
        in response to that the print task content does not include the job end identifier, determining whether each page-beginning-identifier in the print task content has a corresponding page-ending-identifier to obtain a second determination result;
        after obtaining the second determination result, determining whether a print task cancellation instruction is received to obtain a third determination result; and
        according to the second determination result and the third determination result, determining the transmitting strategy of the print task content; and
    transmit the print task content to the image forming apparatus according to the transmitting strategy.

8. The device according to claim 7, wherein to determine the transmitting strategy, the processor is further configured to:
    in response to that the print task content includes the job end identifier, transmit print task content the cached in the memory space to the image forming apparatus.

9. The device according to claim 7, wherein to determine the transmitting strategy, the processor is further configured to:
    in response to that the each page-beginning-identifier in the print task content has the corresponding page-ending-identifier and the print task cancellation instruction is received, add the job end identifier on a last page of the print task content.

10. The device according to claim 7, wherein to determine the transmitting strategy, the processor is further configured to:
    in response to that a last one page-beginning-identifier in the print task content does not have a corresponding page-ending-identifier and the print task cancellation instruction is received, discard content after a last one page-ending-identifier in the print task content.

11. The device according to claim 7, wherein to determine the transmitting strategy, the processor is further configured to:
    in response to that the each page-beginning-identifier in the print task content has the corresponding pageending-identifier and the print task cancellation instruction is not received, transmit the cached print task content to the image forming apparatus.

12. The device according to claim 7, wherein to determine the transmitting strategy, the processor is further configured to:

in response to that a last one page-beginning-identifier in the print task content does not have a corresponding page-ending-identifier and the print task cancellation instruction is not received, continue to receive and cache the print task content until a last one page-beginning-identifier in cached print task content has a corresponding page-ending-identifier.

13. A non-transitory computer-readable storage medium containing computer-executable instructions, and when being executed, the computer-executable instructions cause a processor to perform:

obtaining a print task content, transmitted by application software, into a form recognizable by an image forming apparatus;

caching the print task content in a memory space, wherein the print task content includes print identifiers;

determining whether the print identifiers in the print task content cached in the memory space include a job end identifier to obtain a first determination result, and determining a transmitting strategy of the print task content according to the first determination result, by:

in response to that the print task content does not include the job end identifier, determining whether each page-beginning-identifier in the print task content has a corresponding page-ending-identifier to obtain a second determination result;

after obtaining the second determination result, determining whether a print task cancellation instruction is received to obtain a third determination result; and according to the second determination result and the third determination result, determining the transmitting strategy of the print task content; and transmitting the print task content to the image forming apparatus according to the transmitting strategy.

14. The storage medium according to claim 13, wherein determining the transmitting strategy includes:

in response to that the each page-beginning-identifier in the print task content has the corresponding page-ending-identifier and the print task cancellation instruction is received, adding the job end identifier on a last page of the print task content.

15. The storage medium according to claim 13, wherein determining the transmitting strategy includes:

in response to that a last one page-beginning-identifier in the print task content does not have a corresponding page-ending-identifier and the print task cancellation instruction is received, discarding content after a last one page-ending-identifier in the print task content.

16. The storage medium according to claim 13, wherein determining the transmitting strategy includes:

in response to that the each page-beginning-identifier in the print task content has the corresponding page-ending-identifier and the print task cancellation instruction is not received, transmitting the cached print task content to the image forming apparatus.

17. The storage medium according to claim 13, wherein determining the transmitting strategy includes:

in response to that a last one page-beginning-identifier in the print task content does not have a corresponding page-ending-identifier and the print task cancellation instruction is not received, continuing to receive and cache the print task content until a last one page-beginning-identifier in cached print task content has a corresponding page-ending-identifier.

* * * * *